United States Patent
Shechtman et al.

(10) Patent No.: US 8,200,480 B2
(45) Date of Patent: Jun. 12, 2012

(54) DERIVING GEOGRAPHIC DISTRIBUTION OF PHYSIOLOGICAL OR PSYCHOLOGICAL CONDITIONS OF HUMAN SPEAKERS WHILE PRESERVING PERSONAL PRIVACY

(75) Inventors: Slava Shechtman, Haifa (IL); Raphael Steinberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/569,921

(22) Filed: Sep. 30, 2009

(65) Prior Publication Data

US 2011/0077946 A1    Mar. 31, 2011

(51) Int. Cl.
G10L 11/00 (2006.01)
G10L 21/00 (2006.01)
H04K 1/00 (2006.01)

(52) U.S. Cl. .................. 704/201; 704/270; 380/275

(58) Field of Classification Search .............. 704/231, 704/270, 275, 201, 203; 600/529, 532; 380/275, 380/276
See application file for complete search history.

(56) References Cited

U.S. PATENT DOCUMENTS

| | | | | |
|---|---|---|---|---|
| 4,750,205 A | * | 6/1988 | Lee et al. | 380/276 |
| 6,231,519 B1 | * | 5/2001 | Blants et al. | 600/529 |
| 6,238,337 B1 | | 5/2001 | Kambhatla et al. | |
| 6,289,313 B1 | * | 9/2001 | Heinonen et al. | 704/270 |
| 7,069,233 B2 | | 6/2006 | Bracken et al. | |
| 7,069,590 B1 | * | 6/2006 | Malvar et al. | 726/26 |
| 7,143,028 B2 | * | 11/2006 | Hillis et al. | 704/203 |
| 7,502,741 B2 | * | 3/2009 | Finke et al. | 704/270 |
| 7,505,898 B2 | * | 3/2009 | Hillis et al. | 704/203 |
| 8,086,458 B2 | * | 12/2011 | Finke et al. | 704/270 |
| 2003/0129578 A1 | | 7/2003 | Mault | |
| 2003/0177038 A1 | | 9/2003 | Rao | |
| 2005/0165623 A1 | * | 7/2005 | Landi et al. | 705/2 |
| 2008/0177571 A1 | * | 7/2008 | Rooney et al. | 705/2 |
| 2008/0279420 A1 | | 11/2008 | Masticola et al. | |
| 2009/0043586 A1 | * | 2/2009 | MacAuslan | 704/270 |
| 2009/0060287 A1 | * | 3/2009 | Hyde et al. | 382/118 |
| 2010/0074525 A1 | * | 3/2010 | Drory et al. | 382/176 |
| 2010/0153433 A1 | * | 6/2010 | Mumford | 707/769 |

FOREIGN PATENT DOCUMENTS

NZ    538348    9/2006
WO    WO2008/013553    1/2008

OTHER PUBLICATIONS

K. Kodama et al., "Experimental Fully Automatic Syndromic Surveillance in Japan", 2007 ISDS 6th Ann. Conf.

* cited by examiner

*Primary Examiner* — Martin Lerner (57) ABSTRACT

A method including: obtaining, via a plurality of communication devices, a plurality of speech signals respectively associated with human speakers, the speech signals including verbal components and non-verbal components; identifying a plurality of geographical locations, each geographic location associated with a respective one of the plurality of the communication devices; extracting the non-verbal components from the obtained speech signals; deducing physiological or psychological conditions of the human speakers by analyzing, over a specified period, the extracted non-verbal components, using predefined relations between characteristics of the non-verbal components and physiological or psychological conditions of the human speakers; and providing a geographical distribution of the deduced physiological or psychological conditions of the human speakers by associating the deduced physiological or psychological conditions of the human speakers with geographical locations thereof.

24 Claims, 5 Drawing Sheets

DERIVING GEOGRAPHIC DISTRIBUTION OF PHYSIOLOGICAL OR PSYCHOLOGICAL CONDITIONS OF HUMAN SPEAKERS WHILE PRESERVING PERSONAL PRIVACY

BACKGROUND

1. Technical Field

The present invention relates to the field of geographical data analysis and more particularly, to a geographically based analysis of human speech.

2. Discussion of the Related Art

Certain physiological and psychological conditions are known to affect human speech. For example, a nasal voice can indicate a nasal congestion or blockage of the nasal passages often resulting from cold or influenza. Coughs of different kinds may indicate a variety of respiratory related diseases. Similarly, changes in prosody such as the rhythm, stress, and intonation of speech may provide information regarding the psychological condition of the speaker.

With global monitoring of public health being an ongoing challenge, there have been several attempts to use speech analysis for deriving valuable information regarding the health of human speakers from their respective speech signals. Such attempts are known to suggest the use of speech analysis in order to deduce the physiological or psychological condition of a human speaker either by detecting particular keywords indicating a specific condition, or by studying the relations between speech signal characteristics and various mental and physical conditions.

BRIEF SUMMARY

One aspect of the invention provides a method comprising: obtaining, via a plurality of communication devices, a plurality of speech signals respectively associated with human speakers, the speech signals including verbal components and non-verbal components; identifying a plurality of geographical locations, each geographic location associated with a respective one of the plurality of the communication devices; extracting the non-verbal components from the obtained speech signals; deducing physiological or psychological conditions of the human speakers by analyzing, over a specified period, the extracted non-verbal components, using predefined relations between characteristics of the non-verbal components and physiological or psychological conditions of the human speakers; and providing a geographical distribution of the deduced physiological or psychological conditions of the human speakers by associating the deduced physiological or psychological conditions of the human speakers with the geographical locations thereof.

Another aspect of the invention provides a system that comprises a server; and a plurality of communication devices in communication with the server, wherein the server is arranged to: obtain, via the plurality of communication devices, a plurality of speech signals respectively associated with human speakers, the speech signals including verbal components and non-verbal components; identify a plurality of geographical locations, each geographic location associated with a respective one of the plurality of the communication devices; extract the non-verbal components from the obtained speech signals; deduce physiological or psychological conditions of the human speakers by analyzing, over a specified period, the extracted non-verbal components, using predefined relations between characteristics of the non-verbal components and physiological or psychological conditions of the human speakers; and provide a geographical distribution of the deduced physiological or psychological conditions of the human speakers by associating the deduced physiological or psychological conditions of the human speakers with the geographical locations thereof.

Yet another aspect of the invention provides a server that comprises: a communication module arranged to obtain, via a plurality of communication devices, a plurality of speech signals respectively associated with human speakers, the speech signals including verbal components and non-verbal components; a location module arranged to identify a plurality of geographical locations, each geographic location associated with a respective one of the plurality of the communication devices; an extraction module arranged to extract the non-verbal components from the obtained speech signals; an analysis module arranged to deduce physiological or psychological conditions of the human speakers by analyzing, over a specified period, the extracted non-verbal components, using predefined relations between characteristics of the non-verbal components and physiological or psychological conditions of the human speakers; and an association module arranged to provide a geographical distribution of the deduced physiological or psychological conditions of the human speakers by associating the deduced physiological or psychological conditions of the human speakers with geographical locations thereof.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "communication device" as used herein in this application, is defined as any device that enables at least audio communication between at least one human speaker and another. Such devices usually include a microphone, a speaker, an audio processing circuitry and a communication module enabling the transmitting and receiving of the speech signals (either over wire-line or wireless). Such devices include, for example, wire-line phones, cellular phones, Personal Device Accessories (PDAs); and personal computers enabling Voice over Internet Protocol (VoIP) sessions.

The term "non verbal components" as used herein in this application in the context of speech signals are defined as speech components that are not included in the spoken language (and therefore the content) used by a human speaker. Non verbal components may include, but are not limited to: coughs, laughs, hiccups, breathing, nasal voice, prosodic characteristics and the like.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
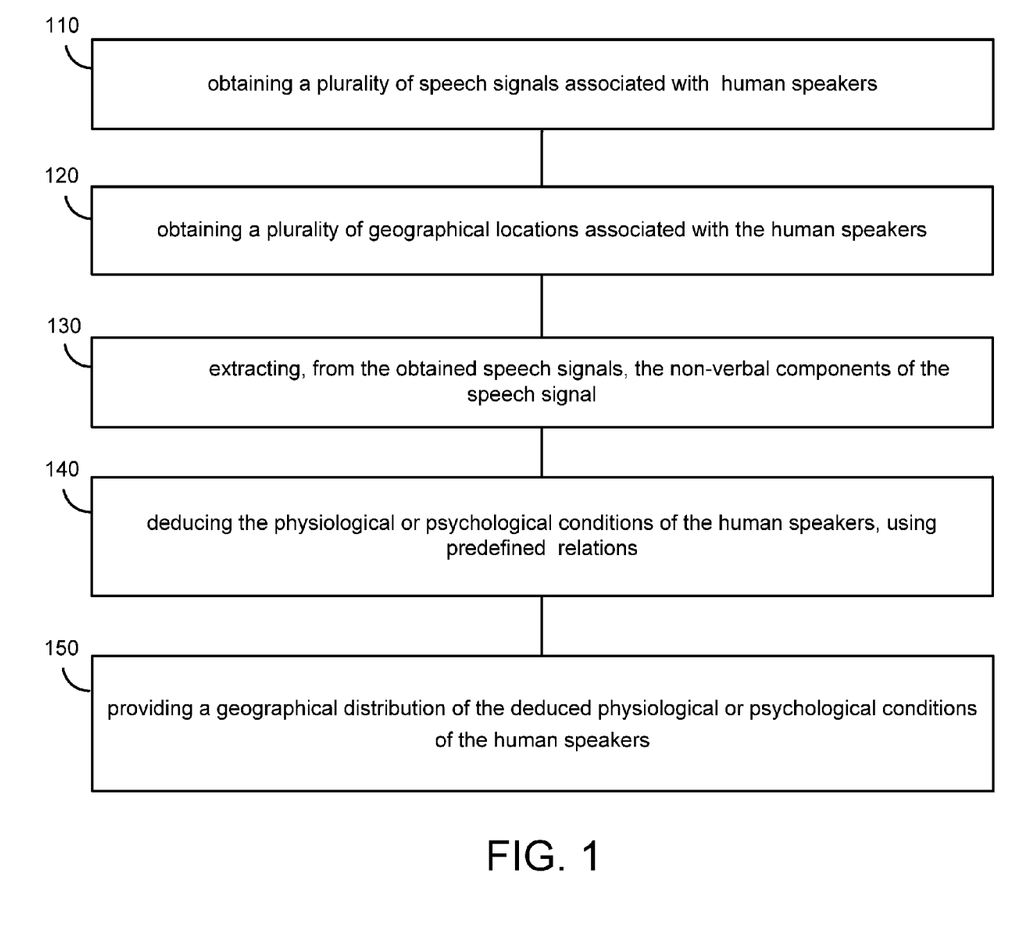
FIG. 1 is a high level flowchart illustrating a method according to some embodiments of the invention.

FIG. 1 is a high level flow chart showing a method according to some embodiments of the invention. The method comprises: obtaining, via a plurality of communication devices associated with a plurality of human speakers, a plurality of speech signals associated with the human speakers, wherein the speech signals include verbal components and non-verbal components 110; obtaining a plurality of geographical locations associated with the plurality of the communication devices 120; extracting, from the obtained speech signals, the non-verbal components 130; analyzing, over a predefined period of time, the extracted non-verbal components, using predefined relations between characteristics of the non-verbal components of the speech signals and physiological or psychological conditions of the human speakers associated with the speech signals, thereby deducing the physiological or psychological conditions of the human speakers 140; and associating the deduced physiological or psychological conditions of the human speakers with the geographical locations thereof, thereby providing a geographical distribution of the deduced physiological or psychological conditions of the human speakers 150.

According to some embodiments of the invention, the physiological or the psychological conditions of the human speakers are associated with the human speakers' respiratory system. A variety of speech related symptoms, such as coughs, nasal voice and heavy breathing may be classified beforehand and used to deduce the particular respiratory system related condition for a given speech signal.

According to some embodiments of the invention, the predefined relations between the characteristics of the non-verbal components of the speech signals and the physiological or the psychological conditions of the human speakers are associated with effects of a particular health condition of a human speaker on the non-verbal components of a speech signal associated with the human speaker. These relations may be gathered from a predefined database in which particular non-verbal components are classified in view of their corresponding physiological or the psychological conditions. Alternatively, the relations are in the form of a learning decision function that is being updated during usage.

Figure 2:
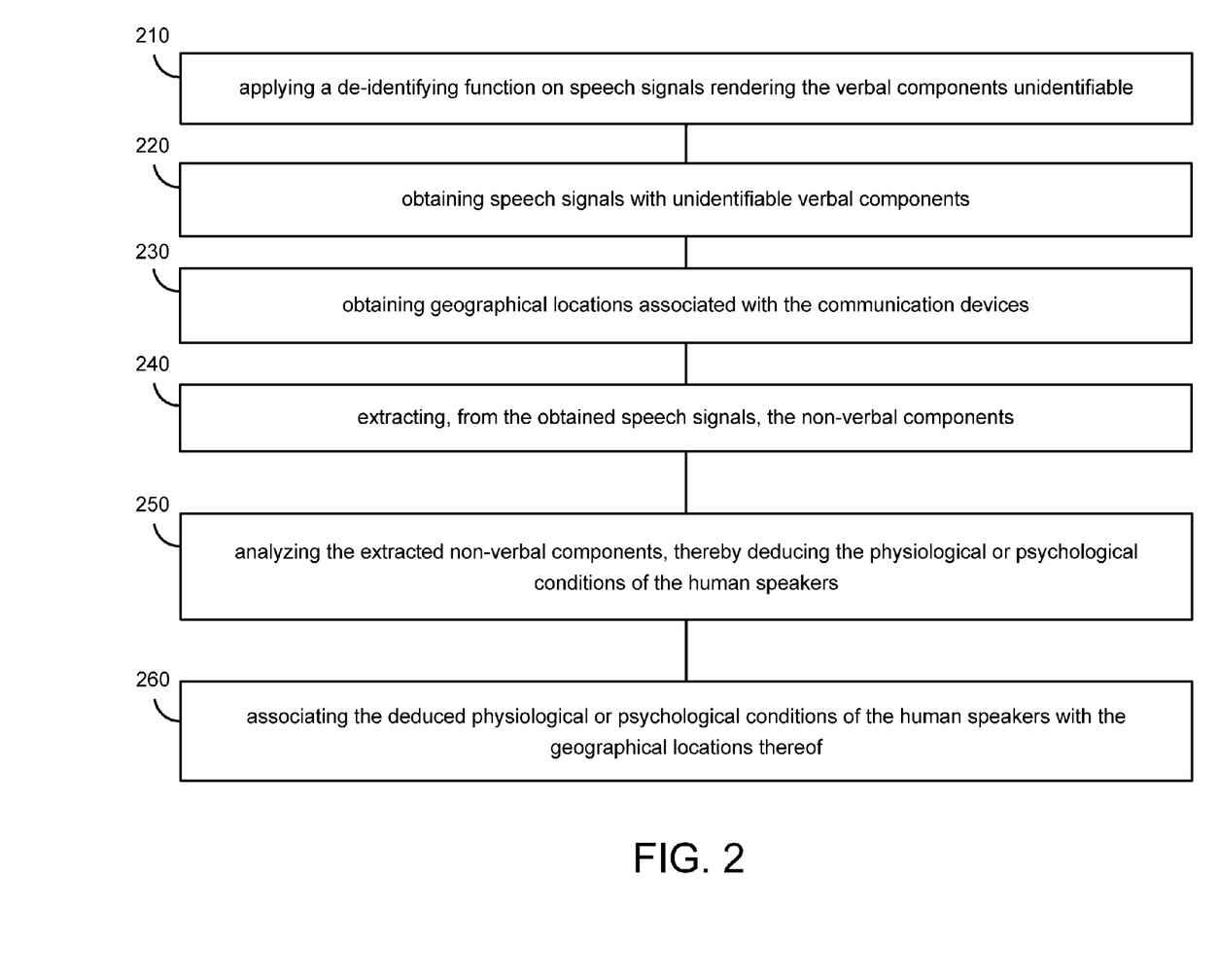
FIG. 2 is a high level flowchart illustrating a method according to some embodiments of the invention.

FIG. 2 is a high level flow chart showing a method according to some embodiment of the invention. The method comprises: applying a de-identifying function on speech signals obtained from a plurality of communication devices associated with a plurality of human speakers, rendering the verbal components unidentifiable 210; obtaining, the speech signals, wherein the speech signals include verbal components and non-verbal components and in which the verbal components are unidentifiable 220; obtaining a plurality of geographical locations associated with the plurality of the communication devices 230; extracting, from the obtained speech signals, the non-verbal components 240; analyzing, over a predefined period of time, the extracted non-verbal components, using predefined relations between characteristics of the non-verbal components of the speech signals and physiological or psychological conditions of the human speakers associated with the speech signals, thereby deducing the physiological or psychological conditions of the human speakers 250; and associating the deduced physiological or psychological conditions of the human speakers with the geographical locations thereof, thereby providing a geographical distribution of the deduced physiological or psychological conditions of the human speakers 260.

Figure 3:
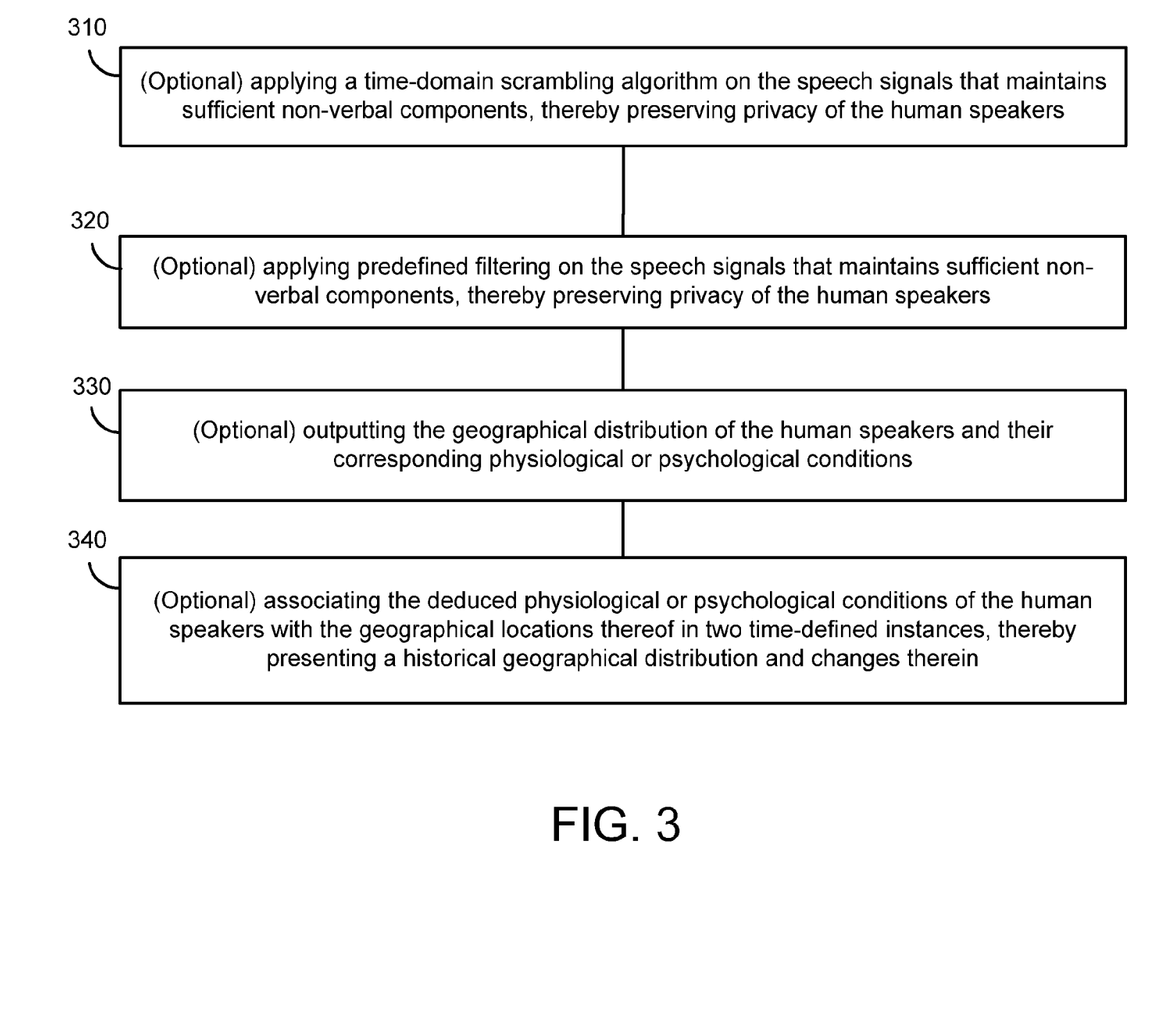
FIG. 3 is a high level flowchart illustrating optional features of a method according to some embodiments of the invention.

FIG. 3 is a high level flow chart showing optional features according to some embodiment of the invention.

According to some embodiments of the invention, extracting of the non-verbal components is performed such that verbal content associated with the speech signals becomes unidentifiable. Advantageously, none of the original verbal components may be reconstructed from the extracted non-verbal components. The de-identification of the speech signal may be achieved by various ways. For example, the method may comprise applying a time-domain scrambling algorithm on the speech signals while maintaining sufficient non-verbal components for deducing the physiological or psychological condition of the human speaker, thereby preserving privacy of the human speakers 310. Alternatively, the method may comprise applying predefined time-domain windowing or frequency-domain filtering on the speech signals resulting in partial speech signals while maintaining sufficient non-verbal components for deducing the physiological or psychological condition of the human speaker, thereby preserving privacy of the human speakers 320.

According to some embodiments of the invention, the method further comprises outputting the geographical distribution of the human speakers and their corresponding physiological or psychological conditions 330. The output may be in the form of a report (either textual or visual) or on any type of display enabling visual representation in the form of Geographic Indicator System (GIS) maps that help visualize tempo-spatial information. The output may be also in the form of an alarm, if certain predefined criteria are met.

According to some embodiments of the invention, the method further comprises associating of the deduced physiological or psychological conditions of the human speakers with the geographical locations thereof, is performed in at least two time-defined instances, thereby presenting a historical geographical distribution, by presenting a change of the physiological or psychological conditions of the human speakers, over the two time-defined instances, in view of the geographical locations thereof 340. Changes over time may be shown, for examples, on vector maps that show directions of propagation of a disease or more specifically, the direction of a population that has been identified as having a particular predefined physiological condition.

Figure 4:
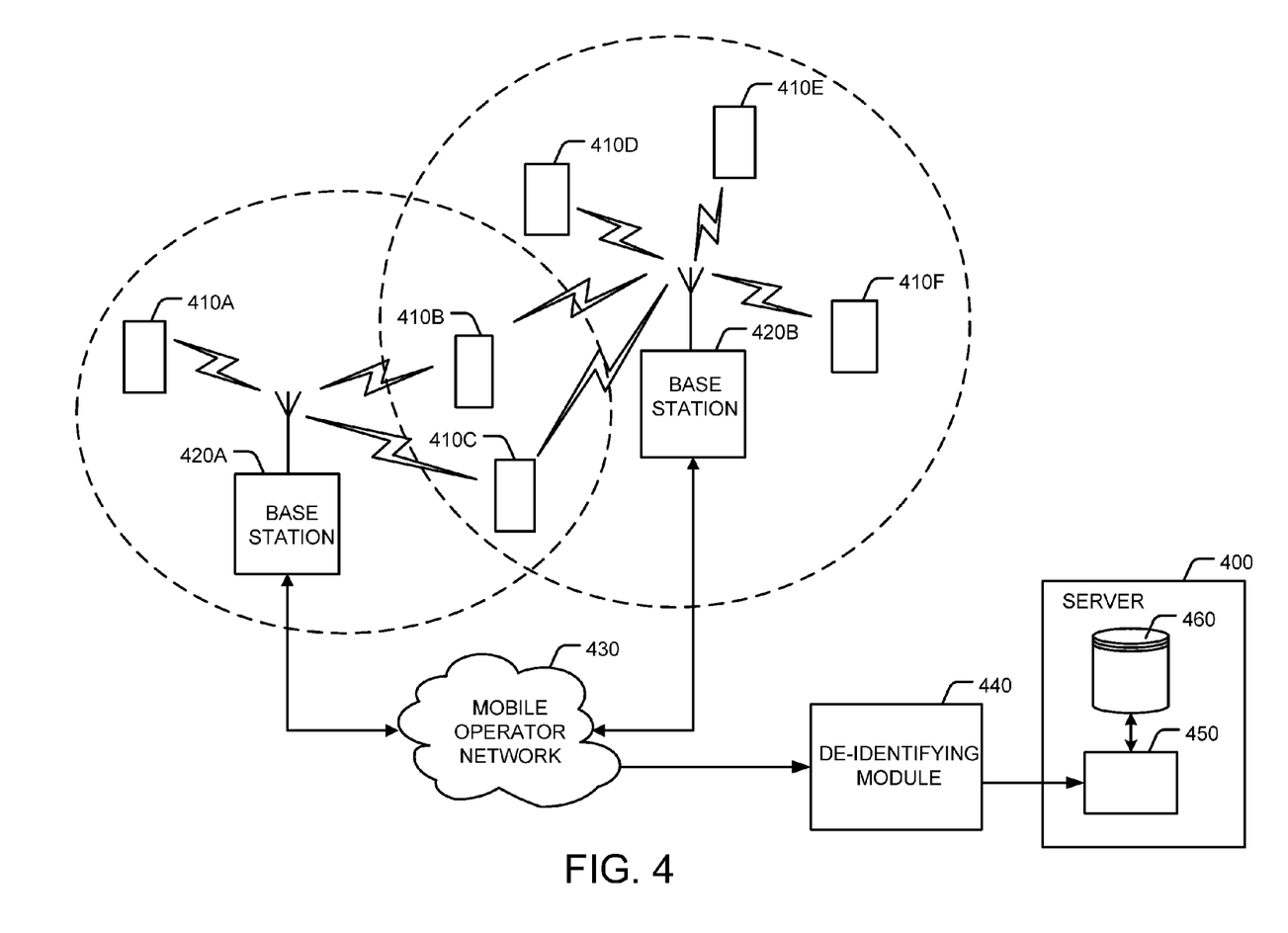
FIG. 4 is a high level schematic block diagram of a system according to some embodiments of the invention.

FIG. 4 is a high level schematic block diagram of a system according to some embodiments of the invention. The system comprises a server 400 and a plurality of communication devices 410A-410F associated with a plurality of human speakers (not shown). Communication devices 410A-410F may be operable, by way of example, over a communication network, such as a cellular communication network comprising base stations 420A and 420B connected to mobile operator network 430, which in turn is coupled to server 400.

Server 400 may access data retrieved by mobile operator network 430. Specifically, server 400 is arranged to obtain, from communication devices, 410A-410F a plurality of speech signals associated with the human speakers, wherein the speech signals include verbal components and non-verbal components. Server 400 is further arranged to obtain, for example via mobile operator network 430, a plurality of geographical locations associated with communication devices 410A- 410F. Server 400 is further arranged to extract, from the obtained speech signals, the non-verbal components of the signals. Server 400 is further arranged to analyze the extracted non-verbal components, using predefined relations between characteristics of the non-verbal components of the speech signals and physiological or psychological conditions of the human speakers associated with the speech signals, thereby deducing the physiological conditions of the human speakers. Server 400 is further arranged to associate the deduced physiological conditions of the human speakers with the geographical locations thereof, thereby providing a geographical distribution of the deduced physiological or psychological conditions of the human speakers.

According to some embodiments of the invention, the system further comprises a de-identifying module 440 connected between server 400 and mobile operator network 430. De-identifying module 440 is operable independently of server 400 and is arranged to apply a de-identifying function on the speech signals, prior to server 400 obtaining thereof, rendering the verbal components unidentifiable. Advantageously, configuring de-identifying module 440 as a module independent of server 400 provides better preservation of privacy as server 400 cannot access identifiable speech signals.

Server 400, may be in the form of a computer comprising, in some embodiments, a processor 450 and a storage module 460. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

According to some embodiments of the invention, server 400 is further arranged to extract non-verbal components from the speech signals such that verbal content associated with the speech signals becomes unidentifiable. This embodiment is advantageous in case server 400 is configured to be operable as a standalone system or in order to further increase personal privacy.

According to some embodiments of the invention, server 400 is further arranged to apply predefined time-domain windowing or frequency-domain filtering on the speech signals resulting in partial speech signals while maintaining sufficient non-verbal components for deducing the physiological or psychological condition of the human speaker, thereby preserving privacy of the human speakers.

According to some embodiments of the invention, the physiological or the psychological conditions of the human speakers are associated with the human speakers' respiratory system.

According to some embodiments of the invention, the predefined relations between the characteristics of the non-verbal components of the speech signals and the physiological or the psychological conditions of the human speakers are associated with effects of a particular health condition of a human speaker on the non-verbal components of a speech signal associated with the human speaker.

According to some embodiments of the invention, server 400 is arranged to associate the deduced physiological or psychological conditions of the human speakers with the geographical locations thereof, in at least two time-defined instances, thereby presenting a historical geographical distribution, by presenting a change of the physiological or psychological conditions of the human speakers, over the two time-defined instances, in view of the geographical locations thereof.

Figure 5:
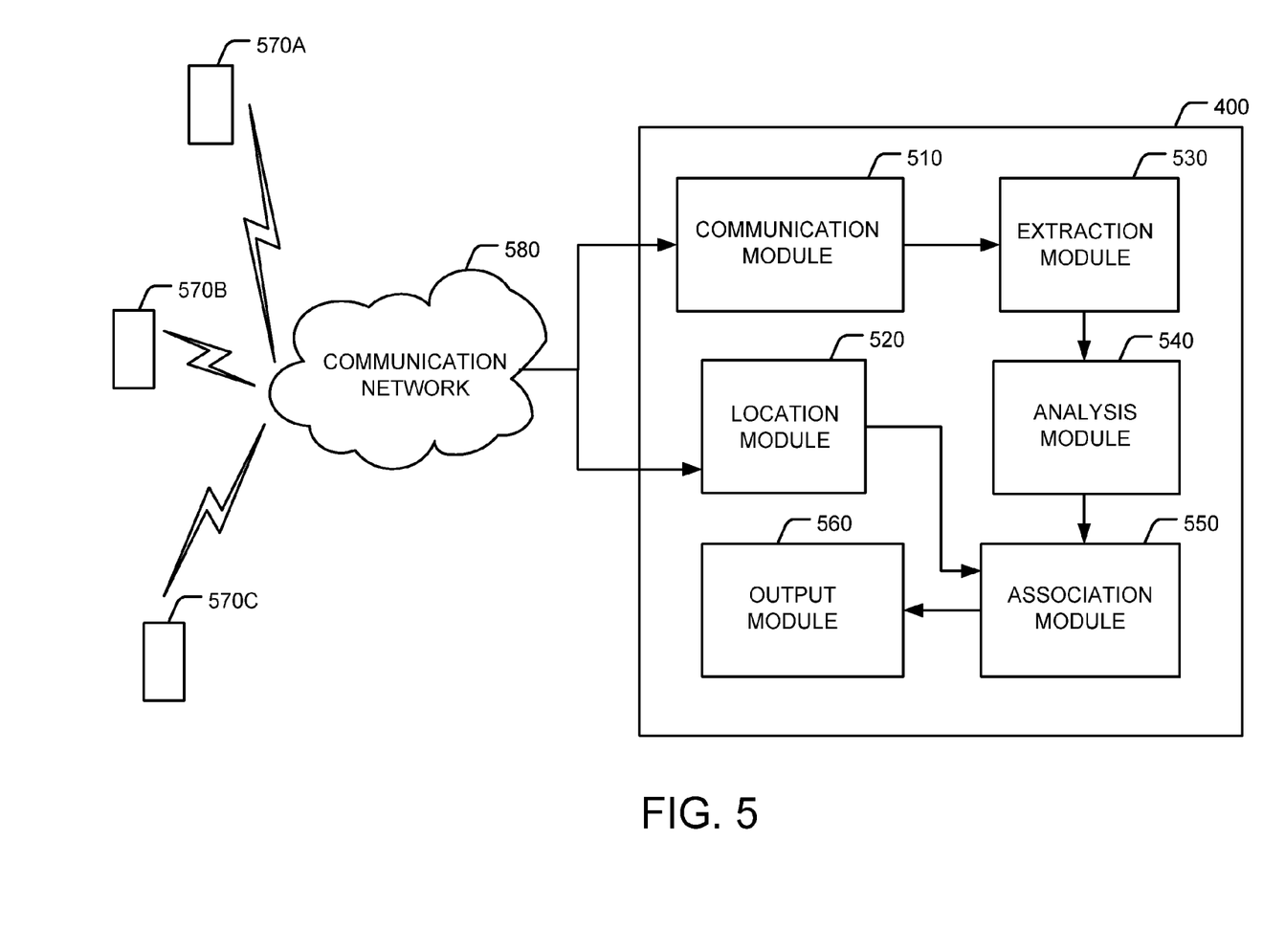
FIG. 5 is a high level schematic block diagram of a server according to some embodiments of the invention.

FIG. 5 is a high level schematic block diagram of a server according to some embodiments of the invention. Server 400, is in communication, via a communication network 580, with a plurality of communication devices 570A-570C that are associated with a plurality of human speakers (not shown). Server 400 comprises a communication module 510 arranged to obtain, from communication devices 570A-570C, a plurality of speech signals associated with the human speakers, wherein the speech signals include verbal components and non-verbal components. Server 400 further comprises a location module 520 coupled to communication network 580 and arranged to obtain a plurality of geographical locations associated with communication devices 570A-570C. Server 400 further comprises an extraction module 530 coupled to communication module 510 and arranged to extract, from the obtained speech signals, the non-verbal components. Server 400 further comprises an analysis module 540 coupled to extraction module 530 and arranged to analyze the extracted non-verbal components, using predefined relations between characteristics of the non-verbal components of the speech signals and physiological or psychological conditions of the human speakers associated with the speech signals, thereby deducing the physiological or psychological conditions of the human speakers. Server 400 may further comprise an association module 550 coupled to both location module 520 and analysis module 540. Association module 550 may be arranged to associate the deduced physiological or psychological conditions of the human speakers with the geographical locations thereof, thereby providing a geographical distribution of the deduced physiological or psychological conditions of the human speakers.

According to some embodiments of the invention, server 400 further comprises an output module 560 arranged to output the geographical distribution of the human speakers and their corresponding physiological or psychological conditions.

According to some embodiments of the invention, extraction module 530 is further arranged to extract non-verbal components from the speech signals such that verbal content associated with the speech signals becomes unidentifiable.

According to some embodiments of the invention, communication module 510 is arranged to apply a time-domain scrambling algorithm on the speech signals while maintaining sufficient non-verbal components for deducing the physiological or psychological condition of the human speaker, thereby preserving privacy of the human speakers.

According to some embodiments of the invention, communication module 510 is arranged to apply predefined time-domain windowing or frequency-domain filtering on the speech signals resulting in partial speech signals while maintaining sufficient non-verbal components for deducing the physiological or psychological condition of the human speaker, thereby preserving privacy of the human speakers.

According to some embodiments of the invention, the physiological or the psychological conditions of the human speakers are associated with the human speakers' respiratory system.

According to some embodiments of the invention, the predefined relations between the characteristics of the non-verbal components of the speech signals and the physiological or the psychological conditions of the human speakers are associated with effects of a particular health condition of a human speaker on the non-verbal components of a speech signal associated with the human speaker.

According to some embodiments of the invention, association module 550 is arranged to associate the deduced physiological or psychological conditions of the human speakers with the geographical locations thereof, in at least two time-defined instances, thereby presenting a historical geographical distribution, by presenting a change of the physiological or psychological conditions of the human speakers, between the two time-defined instances, in view of the geographical locations thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   obtaining, via a plurality of communication devices, a plurality of speech signals respectively associated with human speakers, the speech signals including verbal components and non-verbal components;
   identifying a plurality of geographical locations, each geographic location associated with a respective one of the plurality of the communication devices;
   de-identifying the plurality of speech signals so as to preserve the anonymity of the human speaker, wherein de-identifying comprises applying a time-domain scrambling algorithm to the plurality of speech signals, and/or applying time-domain windowing or frequency-domain filtering to the plurality of speech signals;
   extracting the non-verbal components from the obtained speech signals wherein the non-verbal components comprise speech components that are not derivable from the human language,
   deducing physiological or psychological conditions of the human speakers by analyzing, over a specified period, the extracted non-verbal components, using predefined relations between characteristics of the non-verbal components and physiological or psychological conditions of the human speakers; and
   providing a geographical distribution of the deduced physiological or psychological conditions of the human speakers by associating the deduced physiological or psychological conditions of the human speakers with the geographical locations thereof.

2. The method according to claim 1, further comprising, before the obtaining, rendering the verbal components unidentifiable by applying a de-identifying function to the speech signals.

3. The method according to claim 1, wherein, in the extracting, verbal content associated with the speech signals is rendered unidentifiable.

4. The method according to claim 1, wherein the physiological or the psychological conditions of the human speakers are related to human respiratory systems.

5. The method according to claim 1, wherein the predefined relations between the characteristics of the non-verbal components of the speech signals and the physiological or the psychological conditions of the human speakers are associated with effects of a particular human speaker health condition on the non-verbal components of the respective speech signal.

6. The method according to claim 1, further comprising outputting the geographical distribution of the human speakers and their corresponding physiological or psychological conditions.

7. The method according to claim 1, wherein the providing is performed in at least two time-defined instances, thereby presenting a historical geographical distribution, by presenting a change of the physiological or psychological conditions of the human speakers, over the two time-defined instances, in view of the geographical locations thereof.

8. The method of claim 1, wherein the non verbal components comprise coughs, or laughs, or hiccups, or breathing, or nasal voice, or a combination thereof.

9. A server comprising:
   a communication module arranged to obtain, via a plurality of communication devices, a plurality of speech signals respectively associated with human speakers, the speech signals including verbal components and non-verbal components;

a location module arranged to identify a plurality of geographical locations, each geographic location associated with a respective one of the plurality of the communication devices;

a de-identification module for de-identifying the plurality of speech signals so as to preserve the anonymity of the human speaker, wherein de-identifying comprises applying a time-domain scrambling algorithm to the plurality of speech signals, and/or applying time-domain windowing or frequency-domain filtering to the plurality of speech signals;

an extraction module arranged to extract the non-verbal components from the obtained speech signals, wherein the non-verbal components comprise speech components that are not derivable from the human language;

an analysis module arranged to deduce physiological or psychological conditions of the human speakers by analyzing, over a specified period, the extracted non-verbal components, using predefined relations between characteristics of the non-verbal components and physiological or psychological conditions of the human speakers; and an association module arranged to provide a geographical distribution of the deduced physiological or psychological conditions of the human speakers by associating the deduced physiological or psychological conditions of the human speakers with the geographical locations thereof.

10. The server according to claim 9, wherein the extraction module is further arranged such that verbal content associated with the speech signals is rendered unidentifiable.

11. The server according to claim 9, wherein the physiological or the psychological conditions of the human speakers are related to human respiratory systems.

12. The server according to claim 9, wherein the predefined relations between the characteristics of the non-verbal components of the speech signals and the physiological or the psychological conditions of the human speakers are associated with effects of a particular human speaker health condition on the non-verbal components of the respective speech signal.

13. The server according to claim 9, further comprising an output module arranged to output the geographical distribution of the human speakers and their corresponding physiological or psychological conditions.

14. The server according to claim 9, wherein the association module is arranged to provide the deduced physiological or psychological conditions of the human speakers with the geographical locations thereof, in at least two time-defined instances, thereby presenting a historical geographical distribution, by presenting a change of the physiological or psychological conditions of the human speakers, over the two time-defined instances, in view of the geographical locations thereof.

15. The server of claim 9, wherein the non verbal components comprise coughs, or laughs, or hiccups, or breathing, or nasal voice, or a combination thereof.

16. A system comprising:
a server; and
a plurality of communication devices in communication with the server,
wherein the server is arranged to:
obtain, via the plurality of communication devices, a plurality of speech signals respectively associated with human speakers, the speech signals including verbal components and non-verbal components;

identify a plurality of geographical locations, each geographic location associated with a respective one of the plurality of the communication devices;

de-identify the plurality of speech signals so as to preserve the anonymity of the human speaker, wherein de-identifying comprises applying a time-domain scrambling algorithm to the plurality of speech signals, and/or applying time-domain windowing or frequency-domain filtering to the plurality of speech signals;

extract the non-verbal components from the obtained speech signals wherein the non-verbal components comprise speech components that are not derivable from the human language;

deduce physiological or psychological conditions of the human speakers by analyzing, over a specified period, the extracted non-verbal components, using predefined relations between characteristics of the non-verbal components and physiological or psychological conditions of the human speakers; and provide a geographical distribution of the deduced physiological or psychological conditions of the human speakers by associating the deduced physiological or psychological conditions of the human speakers with the geographical locations thereof.

17. The system according to claim 16, wherein the communication devices are cellular communication devices operating within at least one cellular communication network, and wherein the geographical locations and the speech signals are obtained from the at least one cellular communication network.

18. The system according to claim 16, wherein the server is further arranged to extract non-verbal components from the speech signals such that verbal content associated with the speech signals becomes unidentifiable.

19. The system according to claim 16, wherein the physiological or the psychological conditions of the human speakers are associated with the human speakers' respiratory system.

20. The system according to claim 16, wherein the predefined relations between the characteristics of the non-verbal components of the speech signals and the physiological or the psychological conditions of the human speakers are associated with effects of a particular human speaker health condition on the non-verbal components of the respective speech signal.

21. The system according to claim 16, wherein the server is further arranged to associate the deduced physiological or psychological conditions of the human speakers with the geographical locations thereof, in at least two time-defined instances, thereby presenting a historical geographical distribution, by presenting a change of the physiological or psychological conditions of the human speakers, over the two time-defined instances, in view of the geographical locations thereof.

22. The system of claim 16, wherein the non verbal components comprise coughs, or laughs, or hiccups, or breathing, or nasal voice, or a combination thereof.

23. The computer program of claim 16, wherein the non verbal components comprise coughs, or laughs, or hiccups, or breathing, or nasal voice, or a combination thereof.

24. A non-transitory computer program product, the computer program product comprising:
a computer readable storage medium having computer readable program code embodied therewith, the computer readable program code comprising:
computer readable program code configured to obtain, via a plurality of communication devices, a plurality of speech signals respectively associated with human speakers, the speech signals including verbal components and non-verbal components;

computer readable program code configured to identify a plurality of geographical locations, each geographic location associated with a respective one of the plurality of the communication devices;

a computer readable program code configured to de-identify the plurality of speech signals so as to preserve the anonymity of the human speaker, wherein de-identifying comprises applying a time-domain scrambling algorithm to the plurality of speech signals, and/or applying time-domain windowing or frequency-domain filtering to the plurality of speech signals;

computer readable program code configured to extract the non-verbal components from the obtained speech signals, wherein the non-verbal components comprise speech components that are not derivable from the human language;

computer readable program code configured to deduce physiological or psychological conditions of the human speakers by analyzing, over a specified period, the extracted non-verbal components, using predefined relations between characteristics of the non-verbal components and physiological or psychological conditions of the human speakers; and computer readable program code configured to provide a geographical distribution of the deduced physiological or psychological conditions of the human speakers by associating the deduced physiological or psychological conditions of the human speakers with the geographical locations thereof.

* * * * *